May 30, 1967 — D. W. ROWELL — 3,321,951

METHOD AND APPARATUS FOR EXTRUSION OF TUBES

Filed Feb. 24, 1966

INVENTOR.
DOUGLAS W. ROWELL
BY
ATTORNEYS

United States Patent Office 3,321,951
Patented May 30, 1967

3,321,951
METHOD AND APPARATUS FOR EXTRUSION OF TUBES
Douglas W. Rowell, North Woodbury, Conn., assignor to Anaconda American Brass Company, a corporation of Connecticut
Filed Feb. 24, 1966, Ser. No. 529,756
6 Claims. (Cl. 72—265)

This application is a continuation-in-part of my copending application, Serial No. 452,446 filed April 21, 1965, now U.S. Patent No. 3,263,468 which was a continuation-in-part of prior application, Serial No. 171,663 filed February 7, 1962, now abandoned.

This invention relates to a method and apparatus for extruding tubes, and more particularly it relates to a method and apparatus for extruding radially inwardly in a direction perpendicular to the axis of the mandrel and die to define the wall thickness of the tube and reversing the direction of flow into an axial direction to form a tubular member having an outside diameter smaller than the minimum inside diameter of the die.

The customary manner of extruding tubes is to position a mandrel concentrically within a die and thereby define an annular opening between opposed sizing surfaces of the mandrel and die. Thus the minimum inside diameter of the sizing surface of the die establishes the outside diameter of the extruded tube and the maximum outside diameter of the mandrel establishes the inside diameter of the extruded tube with the annular opening between the opposed surfaces determining the wall thickness of the tube. Generally the sizing of these three dimensions of the tube occurs in a common plane which is perpendicular to the axis of the die and mandrel, while the material is extruded in a direction parallel to the axes of the mandrel and die. Any misalignment of the mandrel with respect to the die destroys their concentricity, with resultant eccentricity in the extruded tubular member.

It is the object of the invention to extrude tubes in a manner which will permit some co-axial misalignment of the die and mandrel without destroying the uniformity in wall thickness and shape of the extruded tube. I have found by extruding material radially inwardly between opposing flat parallel surfaces which are perpendicular to the axes of the die and mandrel during which wall thickness is determined and then changing material flow to an axial direction, greater concentricity of the extruded tube is realized even when substantial co-axial misalignment of the tools for forming the tube. Surprisingly, this permissiveness in latitude of alignment is without sacrifice of control over the uniformity and wall thickness of the tube.

Broadly stated, the invention relates to an extrusion press for forming an extruded tube from a billet of the type having a billet chamber and a ram for driving a billet through the chamber. The improvement is comprised of a mandrel positioned partially within the billet chamber about which a tubular billet can be positioned for extrusion. A die is positioned at the outlet end of the billet chamber and has a flat radial surface extending substantially perpendicular to the axis of the press and terminating in a minimum inside sizing diameter. The mandrel has a first flat radial mandrel surface which extends substantially perpendicular to the axis of the press in opposed axially spaced parallel relationship with the radial die surface and defines therebetween a radially inwardly extending aperture sizing means for sizing the wall thickness of the tube. A second axial mandrel surface is joined to the first radial mandrel surface and has a diameter substantially less than the minimum sizing diameter of the die and is positioned inwardly opposite said aperture sizing means to receive the material as it is extruded inwardly from the aperture and size the inside diameter of the tube while deflecting it axially into a tubular member having an outside diameter less than the minimum sizing diameter of the die.

As a consequence of the opposing flat parallel axial spaced surfaces of the mandrel and die defining the wall thickness of the resultant tube and the second mandrel surface having a smaller diameter than the minimum sizing diameter of the die and defining a space between the second mandrel surface and the die, which is greater than the outside diameter of the tube to be extruded, the mandrel and die can be co-axially misaligned to a degree without destroying the concentricity or uniformity in thickness of the tube, provided the opposed parallel mandrel and die surfaces are held axially fixed with respect to each other, which is a simple mechanical expedient. Thus, some lateral flotation of the mandrel relative to the die can be permitted in the apparatus of the invention without diminishing the quality of the extruded tube.

The method of the invention for extruding tubes is comprised of upsetting a billet about a mandrel by forcing it in an axial direction and then forcing the upset billet material radially inwardly in a direction perpendicular to said axial direction to a first position in an annular aperture between the mandrel and a die. A tubular wall is then formed at said first position and the thickness of the wall of the tube is sized by extruding the billet inwardly beyond the first position. The tubular wall is thereafter forced inwardly to a second position away from the die to a smaller diameter than the diameter of the tubular wall at the first position and the inward flow of the tubular member is changed to an axial flow at the second position to form a tube shape which is free from the die except at the first position.

A preferred embodiment of the invention is described hereinbelow with reference to the drawing wherein.

Figure 1:
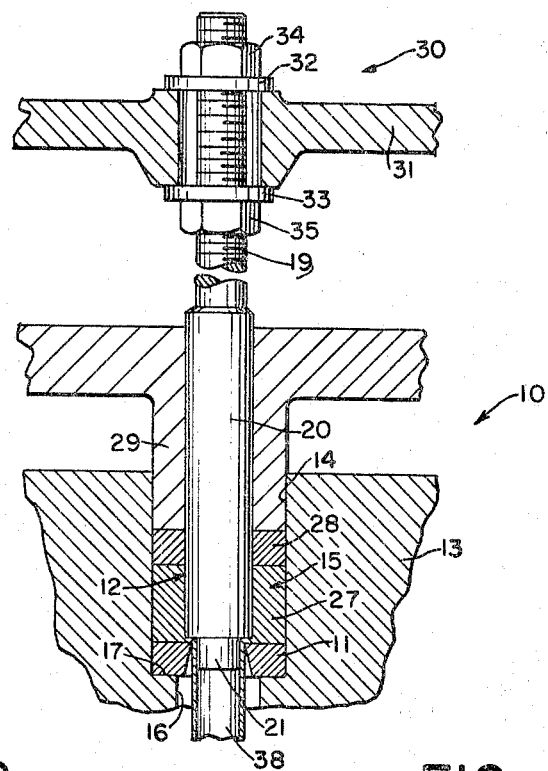
FIG. 1 is a fragmentary elevation partly in section and partly broken away of the extrusion apparatus.

Extrusion apparatus 10 shown in the drawing includes an annular die block 11 and a mandrel 12. The die block 11 is held in a supporting block 13 which has a first enlarged diameter cylindrical bore 14 defining a billet chamber 15 and a second smaller diameter cylindrical bore 16 defining the outlet from the extrusion apparatus. An annular shoulder 17 is defined in the block by the reduction in diameter between the two bores and the die block seats in this shoulder and is held positioned at the outlet end of the billet chamber with a flat annular sizing surface 18 extending perpendicular to axis of the apparatus and facing into the billet chamber. Of course this single block construction is by way of example only; preferred commercial apparatus would most likely be constructed to include pillow blocks and means for ease of changing the die, but the basic positioning of the mandrel and die would remain essentially unchanged.

The mandrel 12 is comprised of a threaded end portion 19, a first cylindrical intermediate portion 20 extends axially within the billet chamber and a second integral cylindrical end portion 21 extends co-axially with and has a diameter less than that of the first cylindrical portion. A radially inwardly extending annular flat shoulder surface 22 is defined between the first and second cylindrical portions of the mandrel and the shoulder surface; this flat mandrel surface extends perpendicular to the axis of the apparatus and is in opposed parallel axial spaced relationship with the flat die surfce 18 to define an annular radially inwardly extending sizing aperture 23 between the two surfaces. The lower rim 24 of the first cylindrical portion of the mandrel is inwardly beveled at an angle of about 15° to the axis of the apparatus to define a converging orifice 25 into the aperture. At the juncture between the flat shoulder surface 22 of the mandrel and the second cylindrical portion 21 is an annular radius 26. This radius 26 is in juxtaposition with the aperture 23 and the second cylindrical portion 21 extends axially beyond the die block 11.

In one example the billet chamber 15, die 11, and mandrel 12 were preheated to about 590° and a copper alloy tubular billet 27 (#274 Alloy-copper alloy containing about 37% zinc) was heated to about 775° C. and placed within the billet chamber about the first cylindrical portion of the mandrel. The tubular billet 27 had an inside diameter slightly greater than the diameter of the first cylinder portion and an outside diameter slightly less than the inside diameter of the billet chamber for ease of insertion into the chamber. One end portion of the billet seats on an annular portion of the radial surface of the die block 11. An annular dummy block 28 is placed in the billet chamber 15 against the opposite end of the billet 27 and is dimensioned like the billet for ease of insertion into the billet chamber. An extrusion ram 29 which is mounted and powered in the usual way for insertion into the billet chamber, is brought forward and presses against the dummy block 28.

Adjustment means 30 are provided on the mandrel. The threaded end portion 19 of the mandrel extends through a mandrel supporting plate 31 mounted behind the billet chamber. Washers 32 and 33 are disposed about the threaded portion of the mandrel on both sides of the mandrel supporting plate 31 and nuts 34 and 35 are threaded on the threaded portion of the mandrel to press the washers against the mandrel support. Thus, by loosening the nuts and moving them along the threaded portion of the mandrel, the axial positioning of the mandrel can be varied; by this means or any other suitable adjustment the axial space between the flat sizing die surface 18 and the flat sizing mandrel surface 22 can be varied.

Figure 2:
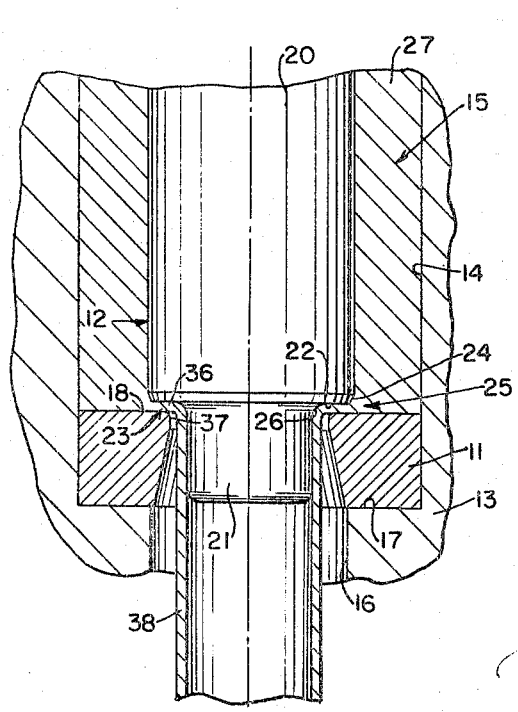
FIG. 2 is an enlarged elevation partly in section of the extrusion apparatus in which the mandrel and die are co-axially aligned.

Referring now to FIGS. 1 and 2, the mandrel 12 and die 11 are co-axially aligned and upon application of pressure by the ram 29, the billet 27 is forced in an axial direction and is then upset causing the material to enter the converging annular orifice 25 defined by the beveled surface 24 and a portion of the flat die surface underlying the annular billet chamber and is extruded radially inward to a first position between the opposing flat parallel surfaces 18 and 22 of the die and mandrel respectively which extend perpendicular to the axis of the apparatus to form a tubular wall 36 and size the wall thickness. The tubular wall 36 issues out of the outlet of the aperture defined by a minimum sizing surface 37 of the die, which is the minimum inside diameter of the sizing surface of the die that is radially spaced from the second cylindrical portion, and is extruded radially inward to a second position where it contacts the annular radius 26 at the juncture between the second cylindrical portion 21 and the flat sizing surface 22 of the mandrel where it is deflected in an axial direction to form a tubular shaped member 38. The inside diameter of the tube 38 is substantially that of the diameter of the second cylindrical portion and the outside diameter of the tube is less than the minimum sizing diameter of the die so that the tubular member does not contact the die except at the first position in the sizing aperture 23. Thus the difference between the sizing diameter of the die and the axial mandrel surface is greater than the axially spaced difference between the flat radial mandrel surface and the flat radial die surface as clearly shown in FIGURES 2 and 3.

Figure 3:
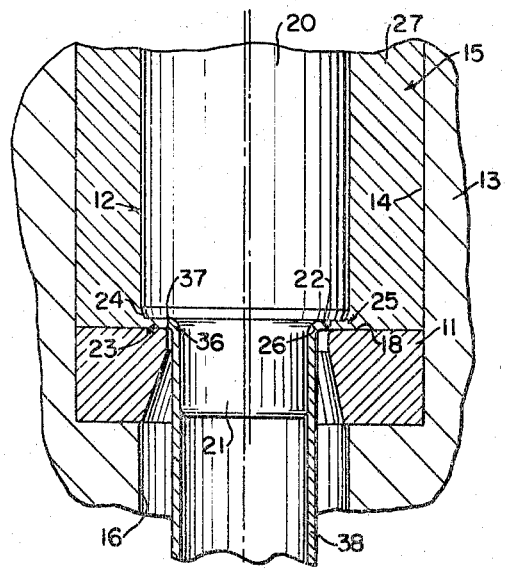
FIG. 3 is an enlarged elevation partly in section of the extrusion apparatus in which the mandrel and die are slightly co-axially misaligned.

Referring to FIG. 3, an important feature of the invention is shown. Here the mandrel 12 is not in co-axial alignment with the die 11; in the drawing the mandrel is closer to the die at the left portion than at the right. Since the axial spacing of the die and mandrel surfaces 18 and 22 remains unaffected by this co-axial misalignment and therefore the wall thickness of the tube will be uniform even when the mandrel floats somewhat in relationship to the die, and furthermore, the inside diameter is determined by deflection of the metal against the second cylindrical portion 21 of the mandrel as long as the mandrel is positioned radially from the minimum sizing surface of the die a distance at least as great as the tubular wall thickness a concentric tube can be extruded.

In one example the first cylindrical portion of the mandrel was about 4¼″ in diameter and the second cylindrical portion of the mandrel was about 2⅛″ in diameter and the minimum sizing surface of the die was 3″. By spacing the die sizing die and mandrel surfaces axially ⅜″ a tube was formed having a 2⅛″ I.D. and a wall gauge of .200″.

I claim:
1. In an extrusion press for forming an extruded tube from a billet, wherein said press has a billet chamber and a ram for driving a billet through said billet chamber, the improvement in combination therewith comprisprising a mandrel positioned partially within the billet chamber about which a tubular billet can be positioned for extrusion, a die positioned at the outlet end of the billet chamber and having a flat radial die surface extending substantially perpendicular to the axis of the press and terminating in a minimum inside sizing diameter, said mandrel having a flat radial mandrel surface extending substantially perpendicular to the axis of the press and in opposed axially spaced parallel relationship with the flat radial die surface and defining therebetween radially inwardly extending aperture sizing means for sizing the wall thickness of the tube, an axial mandrel surface joined to said radial mandrel surface which has a diameter substantially less than both the radial mandrel surface and the minimum sizing diameter of the die with the difference between the minimum sizing diameter of the die and the axial mandrel surface being greater than the axially spaced difference between the flat radial mandrel surface and the flat radial die surface with said axial mandrel surface positioned inwardly opposite said aperture sizing means to receive the material as it is extended inwardly from the aperture and size the inside diameter of the tube while deflecting it axially into a tubular member having an outside diameter less than the minimum sizing diameter of the die.

2. An extrusion press according to claim 1 having means for axially adjusting and holding the mandrel in axial spaced relation with the die.

3. An extrusion press according to claim 1 for extruding cylindrical tubes in which said mandrel has an annular radial mandrel surface and a cylindrical axial mandrel surface, and said die is annular.

4. An extrusion press according to claim 3 having an annular radius in juxtaposition with said aperture sizing means for receiving the material and deflecting it axially.

5. An extrusion press according to claim 4 having means for axially adjusting the mandrel and holding said radial mandrel surface uniformly axially spaced from said radial die surface.

6. A method for extruding tubes which comprises upsetting a billet about a mandrel by forcing it in an axial direction, forcing the upset billet material radially inwardly in a direction perpendicular to said axial direction to a first position in an annular aperture between the mandrel and a die, forming a tubular wall at said first position and sizing the thickness of the wall of the tube by extruding the billet inwardly beyond said first position, forcing the tubular wall inwardly to a second position away from the die to a smaller diameter than the diameter of the tubular wall at the first position, and changing the inward flow of the tubular wall to an axial flow at the second position to form a tube shape which is free from the die except at said first position.

References Cited
UNITED STATES PATENTS

| | | | |
|---|---|---|---|
| 2,778,493 | 1/1957 | Wreidler | 72—265 |
| 2,902,147 | 9/1959 | Meier | 72—266 |
| 2,903,130 | 9/1959 | Reichl | 72—264 |

CHARLES W. LANHAM, *Primary Examiner.*

RICHARD J. HERBST, *Examiner.*

H. DIETER HOINKES, *Assistant Examiner.*